(No Model.)  F. N. & O. VANIER.  2 Sheets—Sheet 1.
TWO SEATED CARRIAGE.

No. 482,858.  Patented Sept. 20, 1892.

WITNESSES,  INVENTORS,
J. M. Hartnett.  Francis N. Vanier
B. M. Williams  Ovila Vanier
By their Atty.
Henry Williams (No Model.) 2 Sheets—Sheet 2.

F. N. & O. VANIER.
TWO SEATED CARRIAGE.

No. 482,858. Patented Sept. 20, 1892.

WITNESSES
J. M. Hartnett
B. W. Williams

INVENTORS
Francis N. Vanier
Ovila Vanier
By their Atty.
Henry W. Williams

UNITED STATES PATENT OFFICE.

FRANCIS N. VANIER AND OVILA VANIER, OF AMESBURY, MASSACHUSETTS.

TWO-SEATED CARRIAGE.

SPECIFICATION forming part of Letters Patent No. 482,858, dated September 20, 1892.

Application filed June 21, 1892. Serial No. 437,496. (No model.)

*To all whom it may concern:*

Be it known that we, FRANCIS N. VANIER and OVILA VANIER, subjects of the Queen of Great Britain, residing in Amesbury, in the county of Essex and State of Massachusetts, have invented a new and useful Improvement in Two-Seated Carriages, of which the following is a specification.

This invention relates to two-seated carriages or wagons which are provided with doors on the sides for admission to or egress from the rear seat; and it consists in the construction below described, whereby the opening of one of the side doors will cause the front seat on that side to slide forward, thus providing ample room on that side for the occupant of the rear seat (which remains stationary) to pass out between the front and rear reats. Closing the door slides the front seat on that side back into its original position.

Figure 1:
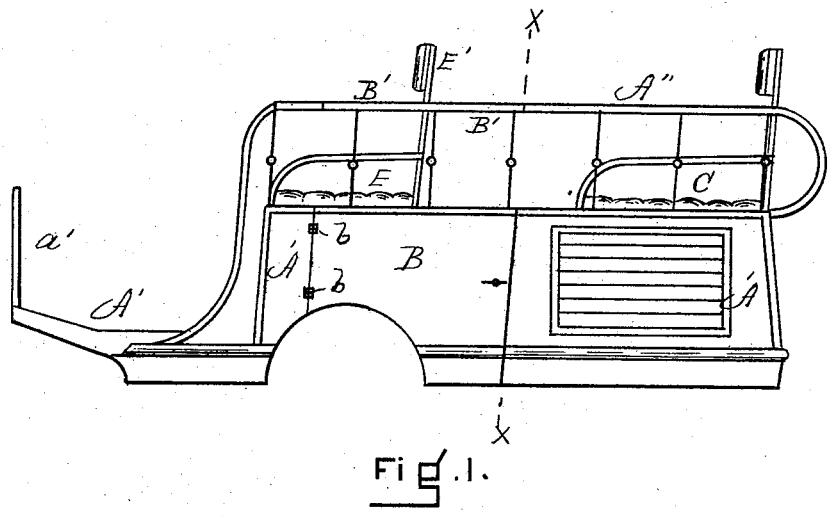
Figure 2:
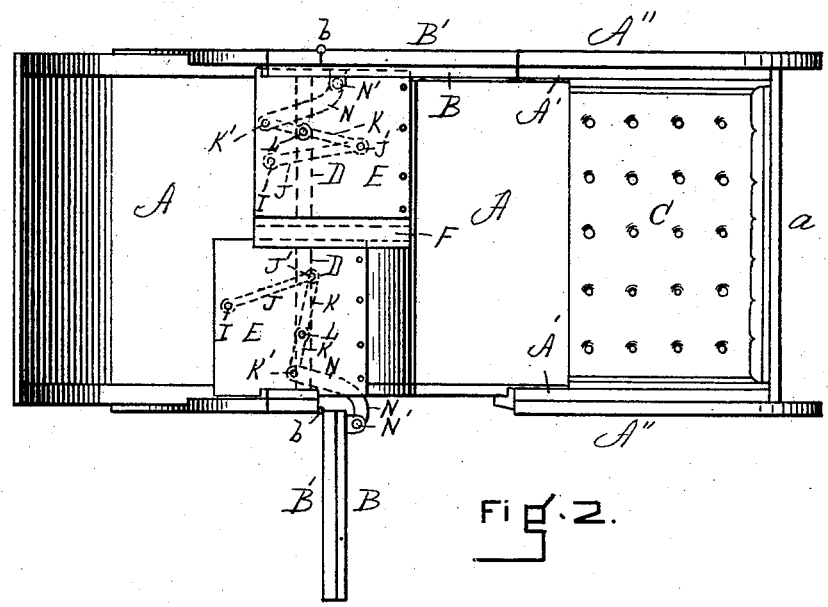
Figure 3:
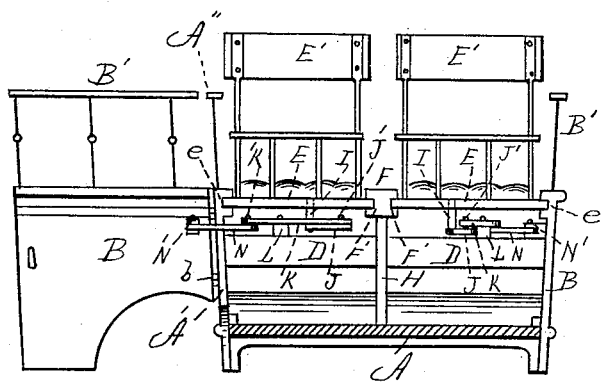

In the accompanying drawings, in which similar letters of reference indicate like parts, Figure 1 is a side elevation of our improved carriage-body with the doors closed. Fig. 2 is a plan view with the cushions and backs of the front seats removed and one of the side doors swung open. Fig. 3 is a cross vertical section on line $x$, Fig. 1, with one of the doors swung open.

The drawings represent a carriage-body provided with a cut-under or wheel-house. The invention is equally applicable, however, to a body with a straight bottom, as the wheel-house forms no part of the improvement.

A A' a a' represent, respectively, the floor, sides, tail-gate, and dash-board of the carriage.

B B are the doors, hinged at b to the sides.

C is the rear seat.

A'' is the rail supported by and rigidly secured to the sides A', and B' B' are the rails supported by and rigidly secured to the doors.

D is a cross-piece extending transversely across the carriage-body, beneath the front seats, and secured at its opposite ends to the sides A'. (See Fig. 3.)

E E are the two front seats. These seats are not stationary, but are sliding seats, and their outer edges rest in the grooves $e$, formed in the inner sides of the sides A', while their inner edges lie in the grooves F' in the longitudinal horizontal supporting-bar F, which is sustained by the central upright or partition H, which is set centrally longitudinally in the carriage-body, beneath the front seats, and is secured to the floor A.

E' E' are the backs of the front seats.

Secured to the under side of each of the front seats E is a pivot-pin I, which extends through one end of the horizontal link J. The other end of this link J is pivotally secured at J' to one end of the horizontal lever K, which is fulcrumed on the pin or pivot L, rigidly secured to the upper side of the cross-piece D. The opposite end of this lever K is pivotally connected at K' with the horizontal link or bar N, whose opposite end is pivotally secured at N' to the door B, near its inner edge.

In operation, when a door E is swung open the link N, lever L, and link J, which were, when the door was closed, in the position shown in broken lines at the upper portion of Fig. 2 and in full lines at the right-hand side in Fig. 3, assume the position shown in broken lines at the under portion of Fig. 2 and in full lines at the left-hand side in Fig. 3, with the effect of sliding the front seat on the side next said door forward, as shown, thus leaving a wide passage for egress at that side between the rear and front seats. Closing the door of course slides the seat back into its original position, the grooves F' and $e$ being the ways in which the seat slides.

Having thus fully described our invention, what we claim, and desire to secure by Letters Patent, is—

1. In a two-seated carriage, the combination of a horizontally-sliding front seat, a door swinging in the side of the carriage-body, and connecting mechanism intermediate with said seat and door, whereby the opening of the door slides the said front seat forward and the closing of the door slides it rearward, substantially as described.

2. In a two-seated carriage, the combination of the horizontally-sliding front seat E, swinging door B, lever K, pivotally secured to the carriage-body, link J, pivotally secured at its opposite ends to the lever K and the seat, and link N, pivotally secured at its opposite ends to the lever K and the door, substantially as set forth.

3. In a two-seated carriage, the combination of the central partition or upright H, provided with the longitudinally-placed bar F, grooved at F' on its opposite sides, the sides A', provided with the grooves e, the sliding front seat E, whose edges rest in said grooves, the swinging door B, and mechanism connecting said door and seat, whereby the opening and closing of the door slides the front seat forward and back, respectively, substantially as described.

FRANCIS N. VANIER.
OVILA VANIER.

Witnesses:
HENRY W. WILLIAMS,
J. M. HARTNETT.